United States Patent Office 2,772,412
Patented Nov. 27, 1956

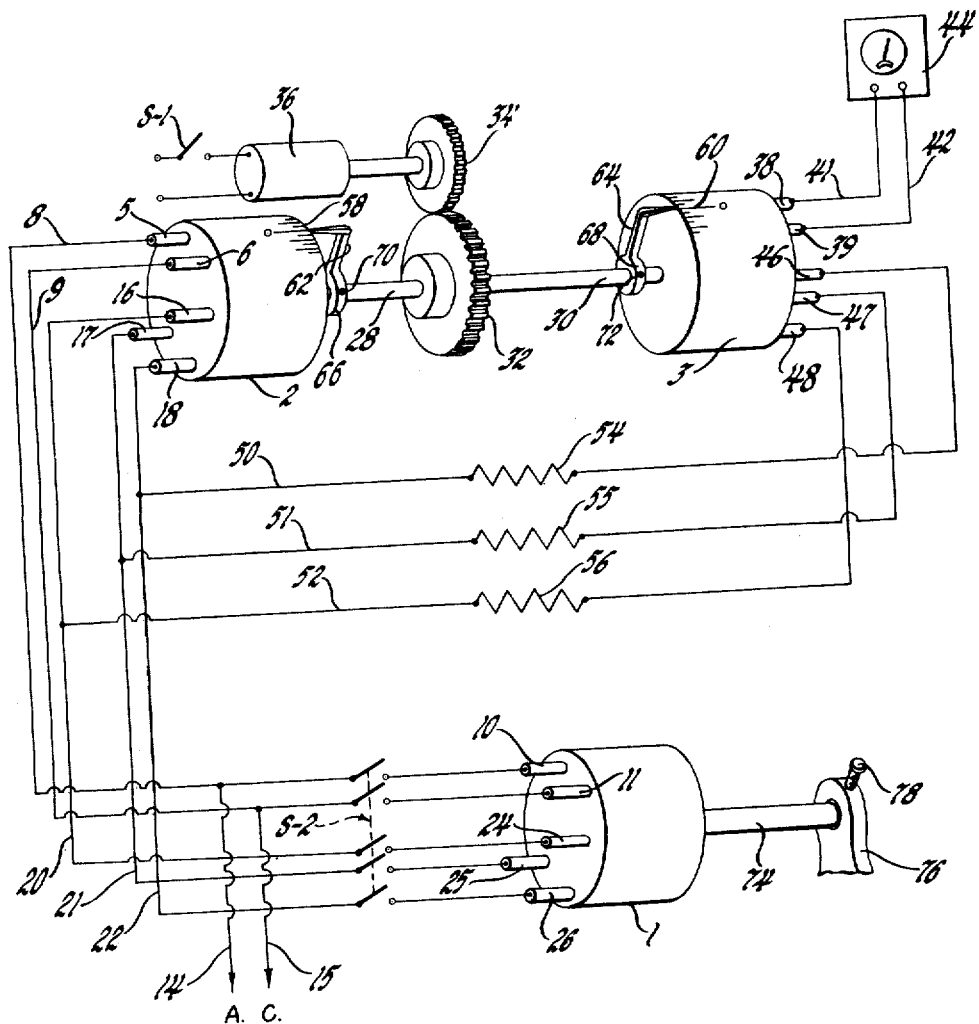

2,772,412

SYNCHRO TESTING

Thomas E. Weiher, Grand Rapids, Mich., assignor to General Motors Corporation, Detroit, Mich., a corporation of Delaware Application February 16, 1955, Serial No. 488,683

7 Claims. (Cl. 340—315)

This invention relates to synchro testing and, more particularly, to a method of and apparatus for evaluating errors in synchro devices as are used in electrical data transmission or repeater systems in which a synchronous repeater device is electrically connected to and caused to follow a positionable synchronous transmitter device.

Slight variations in the manufacture of these devices will affect the accuracy of the data systems in which they are employed and will prevent the repeater device from following closely the transmitter. Since such systems require precise positional correspondence or alignment between the transmitter and the repeater, it is necessary to keep the inherent errors of these devices within prescribed limits and, accordingly, to formulate satisfactory test procedures to ascertain whether their errors exceed these limits.

While several different methods of evaluating synchro errors have been proposed heretofore, none have been entirely satisfactory for production testing of apparatus of this character. In general, most of these prior techniques are quite involved and time consuming, requiring extensive computations from accurately measured and complex test data by skilled operating personnel and, in most cases, they employ a considerable amount of apparatus and equipment including precision standard, master synchro devices.

The present invention thus has among its objects to provide an improved method of and apparatus for evaluating synchro errors which avoid the disadvantages of prior synchro test methods and apparatus and which are characterized by increased speed, ease of operation and simplicity of construction.

Other objects are to provide an improved method of and apparatus for synchro testing which are specially suited for production testing of synchro devices by unskilled personnel and yet afford sufficient accuracy for satisfactory testing of devices of this character without the use of complicated and/or precision calibrated equipment.

In accordance with the present invention, a transmitter synchro is connected electrically to the test synchro repeater. A high impedance pickoff synchro is placed in parallel with this loop and its shaft is rigidly coupled to the transmitter shaft. The transmitter and pickoff synchros are zeroed as a transmitter and receiver respectively.

With the transmitter and test synchro energized, if there is no error in heading between the transmitter and the test synchro as the drive shaft is rotated, there will be no voltage at the pickoff synchro rotor terminals, other than null voltage. Any displacement between the transmitter and test synchro will unbalance the stator loop and cause a voltage to appear at the pickoff rotor proportional to the displacement. This voltage can be converted to degrees, which indicates the accuracy of the test synchro.

The above and other objects, features and advantages together with the operation of the present invention will appear more fully from the following detailed description and single figure of the drawings representing a synchro testing apparatus utilizing the principles of the present invention.

In the drawings, the numeral 1 designates the synchro device which is to be tested and which is shown connected as a repeater in a self synchronous transmission system with a synchronous transmitter device 2. 3 is a pickoff synchro device that is mechanically coupled to the transmitter and electrically connected to the transmitter and repeater to sense any electrical unbalance therebetween.

The synchro devices 1, 2 and 3 may be of the Selsyn or Autosyn variety well known in the art, each having a single phase rotor winding and a three-phase, Y-connected stator winding. The rotor terminals 5 and 6 of the transmitter device 2 are connected over conductors 8, 9 to the rotor terminals 10 and 11 of the test synchro device 1 and are energized in common therewith from a local A. C. voltage source, such as 115 v.–400 cycles, over conductors 14 and 15. The stator terminals 16, 17 and 18 of the transmitter are connected over stator loop conductors 20, 21 and 22 to the corresponding stator terminals 24, 25 and 26 of the test synchro in conventional manner.

The rotor shaft 28 of the transmitter device 2 is rigidly coupled to the rotor shaft 30 of the pickoff synchro 3 and carries a large pinion 32 meshing with a smaller pinion 34 that is driven from a substantially constant speed A. C. or D. C. motor 36 energized from an A. C. or D. C. source through switch S–1.

The pickoff synchro, in accordance with the present invention, is connected in a high impedance circuit and is preferably a high impedance synchro device having a high secondary impedance in relation to the secondary or stator impedance of the test synchro device 1. With 115 volt transmitter and test synchro devices, the pickoff synchro may be a 26 v.–400 cycle synchro, the rotor terminals 38, 39 of which are connected over conductors 41, 42 to a conventional vacuum tube voltmeter or other suitable high impedance indicating device 44 and its stator terminals 46, 47, 48 connected in parallel to the test synchro-transmitter stator loop conductors 20, 21 and 22 over conductors 50, 51 and 52 through individual impedances 54, 55 and 56, connected as shown.

The stator casings of the transmitter and pickoff synchro devices 2 and 3 may be provided with suitable graduated and numerical indicia as 58 and 60 which cooperate with suitable pointers as 62 and 64, respectively. The pointers 62 and 64 are shown carried by sleeves or collars 66 and 68 that are received on the rotor shafts 28 and 30 and are adapted to be locked thereon as by set screws 70 and 72. The rotor shaft 74 of the test synchro device is shown extending through a pedestal mounted bearing 76 having a clamping screw 78 for locking the rotor shaft 74 during a part of the test procedure on each device to be tested, as will be brought out below. A multiple pole single throw switch, indicated at S–2 may be provided in the transmitter-test synchro rotor and stator loop connections for isolating or disconnecting the test synchro device from the transmitter and pickoff synchros during an initial calibration portion of the test procedure.

Initially, the switches S–1 and S–2 are open, and the transmitter and pickoff synchros are zeroed as a transmitter and receiver, respectively, as by turning their interconnected shafts 28 and 30 manually until the vacuum tube voltmeter 44 indicates zero output. The set screws 70 and 72 of the collars for the pointer indicators 62 and 64 may be loosened to reset the pointers to read zero when the transmitter and pickoff are at their electrical zero in the event that the pointers are not at their mechanical zero position. Once the transmitter and pickoff synchros are zeroed, their zero settings are not disturbed and are maintained for all synchros to be tested therewith.

After the transmitter and pickoff synchros have been zeroed, the rotor shaft 74 of the test synchro is locked or clamped by tightening the clamping screw 78. Switch S–2 then is closed to energize the test synchro. The shafts 28 and 30 are then displaced manually to each side of the transmitter zero, an amount, say plus or minus 2 degrees, corresponding to the prescribed limits of tolerable error as specified in the test specifications, and the maximum reading of the vacuum tube voltmeter 44 is noted. The clamp 78 is then released to unlock the rotor of the test synchro, and switch S–1 is closed to energize the drive motor 36 to rotate the coupled shafts of the transmitter and pickoff synchros continuously at a low speed, say 1 or 2 R. P. M., and provide an error spread indication or display on the voltmeter. The operator simply observes the vacuum voltmeter for a reading in excess of the maximum reading obtained with the test synchro locked.

If the maximum reading on the voltmeter is less than the previously observed amount, it indicates that the test synchro follows the transmitter to an accuracy within plus or minus 2 degrees and is acceptable. If the voltmeter excursion is in excess of the maximum locked rotor reading, the test synchro error is too high and the synchro is rejected.

While the transmitter and pickoff synchros could be standardized or calibrated synchro devices, as where the described apparatus is employed as a permanent test stand or fixture, they need not be precision standard or master synchro devices, and, in fact, may have some inherent error therein. Since the pickoff synchro is coupled to the transmitter shaft and is zeroed therewith, it is used only in its electrical zero position so that any error therein will not affect the test results. Since the test synchro is connected as a repeater to follow the transmitter, any inherent error in the transmitter itself does not affect the accuracy of the readings which indicate simply how closely the test synchro follows the transmitter, whether or not the transmitter itself may have any inherent error. It is only the error in the test synchro device that disturbs the electrical balance in the transmitter-test synchro loop and causes unbalance currents that circulate therein and produce unbalance voltages which are applied to the pickoff synchro to operate the error indicating system.

So as not to load the transmitter-test synchro loop, the pickoff synchro device, as mentioned earlier, should be of high impedance relative to the test synchro device. A ratio of pickoff secondary impedance to test synchro secondary impedance of 10 to 1 has been found satisfactory. To assure that the pickoff synchro is connected in a high impedance circuit, the impedances 54, 55 and 56 are inserted in its stator conductors. In the apparatus described, the absolute impedance value of the impedances 54, 55 and 56 may be in the neighborhood of 400 ohms, although different impedance values may be employed depending upon the character of the synchro devices used.

What is claimed is:

1. Test apparatus for determining how closely a synchro repeater device follows a synchro transmitter device each of which devices has a stator winding and a rotor winding, said apparatus comprising, in combination, circuit means connecting said transmitter synchro device and said test synchro device in a self-synchronous data repeater system, a pickoff synchro device having a stator winding and a rotor winding, circuit means connecting the stator winding of said pickoff synchro in a high impedance circuit to the stator windings of said transmitter synchro and said test synchro in said data repeater system, electrical indicating means connected to the rotor winding of said pickoff synchro, and mechanical coupling means interconnecting the rotors of said transmitter synchro and pickoff synchro at their electrical zero positions.

2. Test apparatus for determining how closely a synchro repeater device follows a synchro transmitter device each of which devices has a stator winding and a rotor winding, said apparatus comprising, in combination, circuit means connecting said transmitter synchro device and said test synchro device in a self-synchronous data repeater system, a pickoff synchro device having a stator winding and a rotor winding, circuit means including impedance means connecting the stator winding of said pickoff synchro in a high impedance circuit to the stator windings of said transmitter synchro and said test synchro in said data repeater system, electrical indicating means connected to the rotor winding of said pickoff synchro, and mechanical coupling means interconnecting the rotors of said transmitter synchro and pickoff synchro at their electrical zero positions.

3. Test apparatus for determining how closely a synchro repeater device follows a synchro transmitter device each of which devices has a stator winding and a rotor winding, said apparatus comprising, in combination, circuit means connecting said transmitter synchro device and said test synchro device in a self-synchronous data repeater system, a high impedance pickoff synchro device having a stator winding and a rotor winding, circuit means connecting the stator winding of said pickoff synchro to the stator windings of said transmitter synchro and said test synchro in said data repeater system, electrical indicating means connected to the rotor winding of said pickoff synchro, and mechanical coupling means interconnecting the rotors of said transmitter synchro and pickoff synchro at their electrical zero positions.

4. The combination in accordance with claim 3 above wherein the stator winding of said pickoff synchro device has approximately ten times the impedance of the stator winding of said test synchro.

5. Test apparatus for determining how closely a synchro repeater device follows a synchro transmitter device each of which devices has a stator winding and a rotor winding, said apparatus comprising, in combination, circuit means connecting said transmitter synchro device and said test synchro device in a self-synchronous data repeater system, a high impedance pickoff synchro device having a stator winding and a rotor winding, circuit means connecting the stator winding of said pickoff synchro to the stator windings of said transmitter synchro and said test synchro in said data repeater system, electrical indicating means connected to the rotor winding of said pickoff synchro, mechanical coupling means rigidly interconnecting the rotors of said transmitter synchro and pickoff synchro at their electrical zero positions, and drive means coupled to the rotors of the said transmitter and pickoff synchros.

6. Test apparatus for determining how closely a synchro repeater device follows a synchro transmitter device each of which devices has a stator winding and a rotor winding, said apparatus comprising, in combination, circuit means connecting said transmitter synchro device and said test synchro device in a self-synchronous data repeater system, a pickoff synchro device having a stator winding and a rotor winding, circuit means including impedance means connecting the stator winding of said pickoff synchro in a high impedance circuit to the stator windings of said transmitter synchro and said test synchro in said data repeater system, electrical indicating means connected to the rotor winding of said pickoff synchro, mechanical coupling means interconnecting the rotors of said transmitter synchro and pickoff synchro at their electrical zero positions, and releasable clamping means for locking the rotor of said test synchro device during a part of the test procedure.

7. In a synchro test apparatus including a positionable synchro transmitter and test synchro repeater connected in a self-synchronous data repeater system with a high impedance pickoff synchro mechanically coupled to and electrically zeroed with the transmitter synchro and having a stator winding connected to sense unbalance in said data repeater system and a rotor winding connected to an electrical indicating instrument, the method of determining whether the synchro repeater device follows the synchro transmitter device within a specified number of angular degrees which comprises the steps of locking the synchro repeater against rotation, displacing the transmitter device said specified number of degrees on either side of its zero position and noting the maximum indication of said indicating instrument during this interval, unlocking the synchro repeater and then slowly rotating said transmitter synchro and pickoff synchro and observing said indicating instrument for an indication in excess of said maximum locked rotor reading.

References Cited in the file of this patent

UNITED STATES PATENTS

| | | |
|---|---|---|
| 2,439,414 | Agins | Apr. 13, 1948 |
| 2,619,526 | Willman | Nov. 25, 1952 |
| 2,625,599 | Downes | Jan. 13, 1953 |

FOREIGN PATENTS

| | | |
|---|---|---|
| 711,043 | Great Britain | June 23, 1954 |

Notice of Adverse Decision in Interference

In Interference No. 91,430 involving Patent No. 2,772,412, T. E. Weiher, Synchro testing, final judgment adverse to the patentee was rendered Aug. 23, 1962, as to claims 3 and 5.

[*Official Gazette October 16, 1962.*]

Disclaimer 2,772,412.—*Thomas E. Weiher*, Grand Rapids, Mich. SYNCHRO TESTING. Patent dated Nov. 27, 1956. Disclaimer filed Nov. 20, 1962, by the assignee, *General Motors Corporation*.

Hereby enters this disclaimer to claims 3 and 5 of said patent.

[*Official Gazette December 25, 1962*]